US00RE35328E

United States Patent [19]

Kim

[11] E Patent Number: Re. 35,328

[45] Reissued Date of Patent: Sep. 10, 1996

[54] IDLING ROTATION MECHANISM USED IN THE HOUSING OF A VIDEO CASSETTE TAPE RECORDER

[75] Inventor: Young-Chan Kim, Kyungki-do, Rep. of Korea

[73] Assignee: SamSung Electronics Co., Ltd., Kyungki-do, Rep. of Korea

[21] Appl. No.: 16,287

[22] Filed: Feb. 11, 1993

Related U.S. Patent Documents

Reissue of:

[64] Patent No.: 4,992,895
Issued: Feb. 12, 1991
Appl. No.: 252,512
Filed: Sep. 30, 1988

[30] Foreign Application Priority Data

Sep. 30, 1987 [KR] Rep. of Korea ..... 1987/16926

[51] Int. Cl.[6] ..... G11B 15/68

[52] U.S. Cl. ..... 360/96.5; 360/85

[58] Field of Search ..... 360/85, 95, 96.5, 360/92

[56] References Cited

U.S. PATENT DOCUMENTS

| | | |
|---|---|---|
| 3,964,096 | 6/1976 | Matsuyama . |
| 4,018,403 | 4/1977 | Schultz . |
| 4,379,313 | 4/1983 | Tsuchiya . |
| 4,408,236 | 10/1983 | Murata et al. . |
| 4,410,919 | 10/1983 | Umeda . |
| 4,491,885 | 1/1985 | Morikawa et al. . |
| 4,492,994 | 1/1985 | Suda et al. . |
| 4,611,251 | 9/1986 | Yokoo . |
| 4,628,382 | 12/1986 | Okumura . |
| 4,661,864 | 4/1987 | Kuwajima . |
| 4,661,867 | 4/1987 | Tsubota . |
| 4,672,476 | 6/1987 | Saito et al. . |
| 4,685,009 | 8/1987 | Min et al. . |
| 4,792,871 | 12/1988 | Hutter . |
| 4,930,720 | 6/1990 | Hwang . |
| 5,050,022 | 9/1991 | Aizawa . |
| 5,060,094 | 10/1991 | Chung et al. . |
| 5,062,015 | 10/1991 | Maeng . |

FOREIGN PATENT DOCUMENTS

| | | |
|---|---|---|
| 0129185 | 12/1984 | European Pat. Off. . |
| 0140211 | 5/1985 | European Pat. Off. . |
| 0150128 | 7/1985 | European Pat. Off. . |
| 0192448A2 | 8/1986 | European Pat. Off. . |
| 0190044 | 8/1986 | European Pat. Off. . |
| 0215663A2 | 3/1987 | European Pat. Off. . |
| 2463968 | 2/1981 | France . |
| 2540661 | 8/1984 | France . |
| 55-87339 | 7/1980 | Japan . |
| 57-74859 | 5/1982 | Japan . |
| 57-135472 | 8/1982 | Japan . |
| 58-188354 | 2/1983 | Japan . |
| 59-154665 | 9/1984 | Japan . |
| 2125608 | 3/1984 | United Kingdom . |
| 2156141 | 10/1985 | United Kingdom . |
| 2137798 | 10/1985 | United Kingdom . |

*Primary Examiner*—A. J. Heinz
*Attorney, Agent, or Firm*—Robert E. Bushnell, Esq.

[57] ABSTRACT

An idling rotation mechanism used in a video tape recorder (VTR) to mount and dismount a video cassette tape (VCT) by using only a loading motor. The VCT is mounted and dismounted by moving a holding pin, connected to a VCT holder, along a slot in a support plate. The pin is connected to a idling rotation mechanism that is connected to the loading motor. To prevent the VCT from becoming jammed in the VTR because of excessive rotation of the loading motor, a timing gear in the idling rotation mechanism idles after the pin has been partially moved in the slot.

44 Claims, 6 Drawing Sheets

IDLING ROTATION MECHANISM USED IN THE HOUSING OF A VIDEO CASSETTE TAPE RECORDER

Matter enclosed in heavy brackets [ ] appears in the original patent but forms no part of this reissue specification; matter printed in italics indicates the additions made by reissue.

BACKGROUND OF THE INVENTION

The present invention relates to an idling rotation mechanism, used in the housing of a video cassette tape recorder (VTR), which comprises cams and gears provided on the outside of the housing to mount and dismount a video cassette tape (VCT). The idling rotation mechanism can rotate idly when the VCT is loaded or unloaded from the playback and recording tape heads.

Conventionally, a VTR includes a housing motor for moving the video cassette tape in and out of the VTR, and a separate loading motor for moving the inserted video cassette tape in and out of engagement with the playback and recording tape heads. The housing motor and the loading motor are separately driven during the initial operation and the final positioning of the VCT.

Thus, the conventional VTR, having a plurality of component elements for both the housing motor and the loading motor, becomes quite complicated. As a result of the added complication of a separate housing and loading motor, the rate of malfunctioning is quite high, repairs become more difficult, and the size and weight of the VTR must be increased to accommodate the added components. Consequently, it becomes difficult to make a compact and light VTR having both a loading motor and a housing motor.

SUMMARY OF THE INVENTION

The object of the present invention is to provide an idling rotation mechanism, used in the housing of a VTR, which simplifies the component elements so that a singular loading motor can mount and dismount a VCT from the VTR as well as load and unload the VCT from the playback and recording tape heads. Another object of the present invention is to provide an idling rotation mechanism that can idly rotate when the VCT is being loaded and unloaded.

The idling rotation mechanism of the present invention is preferably used in a front loading VTR, for recording and reproducing video signals on a magnetic tape, and comprises:

a motor;

a speed-variation means drivingly connected to the output shaft of said motor to vary the transmitted rotational speed thereof; and a drive means for a cassette transporting holder having means for cutting off rotation of the drive means, said means for cutting off rotation is operatively associated with said speed-variation means and actuated by a rotational force of said motor to cut off transmission of the rotational force of said motor and prevent the cassette transporting holder from moving any further after the cassette tape has been loaded in the deck.

DESCRIPTION OF THE PREFERRED EMBODIMENT

The present invention will now be described specifically with reference to the attached drawings.

Figure 1:
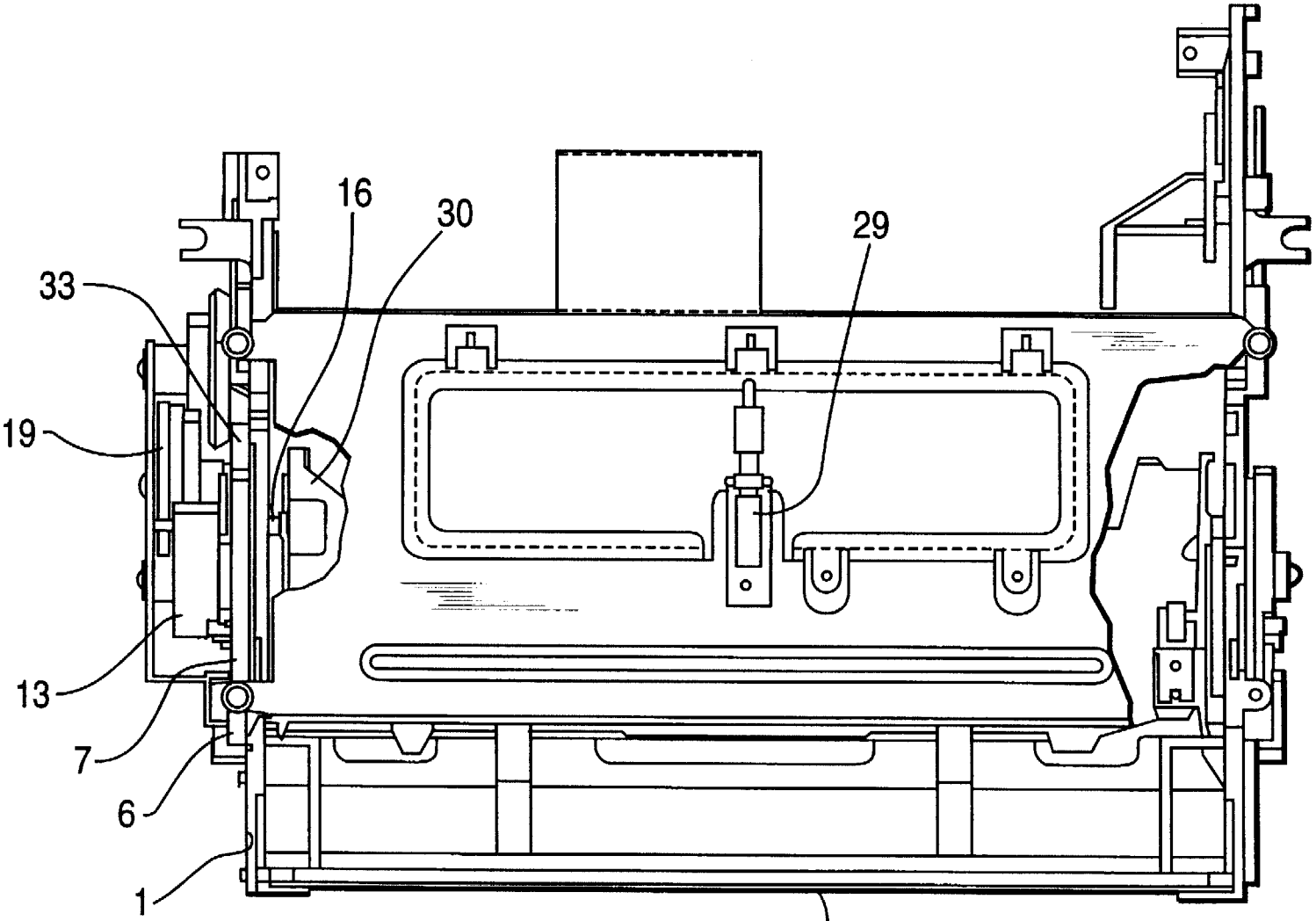
FIG. 1 is a plan view of a tape recorder housing of the present invention.

FIG. 1 is a plan view of a VTR housing 1 of the present invention, which shows a cassette switch 29 that is activated when VCT 32 is inserted into the VTR, and an idling rotation mechanism comprising an arm gear 13, a side arm 7, timing gear 19 and relay gear 6. Connected to side arm 7 is a guide pin 16 that is also connected to an inside holder 30. Guide pin 16 is moved along guide slot 5, in support plate 33, by side arm 7 so that inside holder 30 can mount and dismount the VCT 32 from the VTR.

Figure 2A:
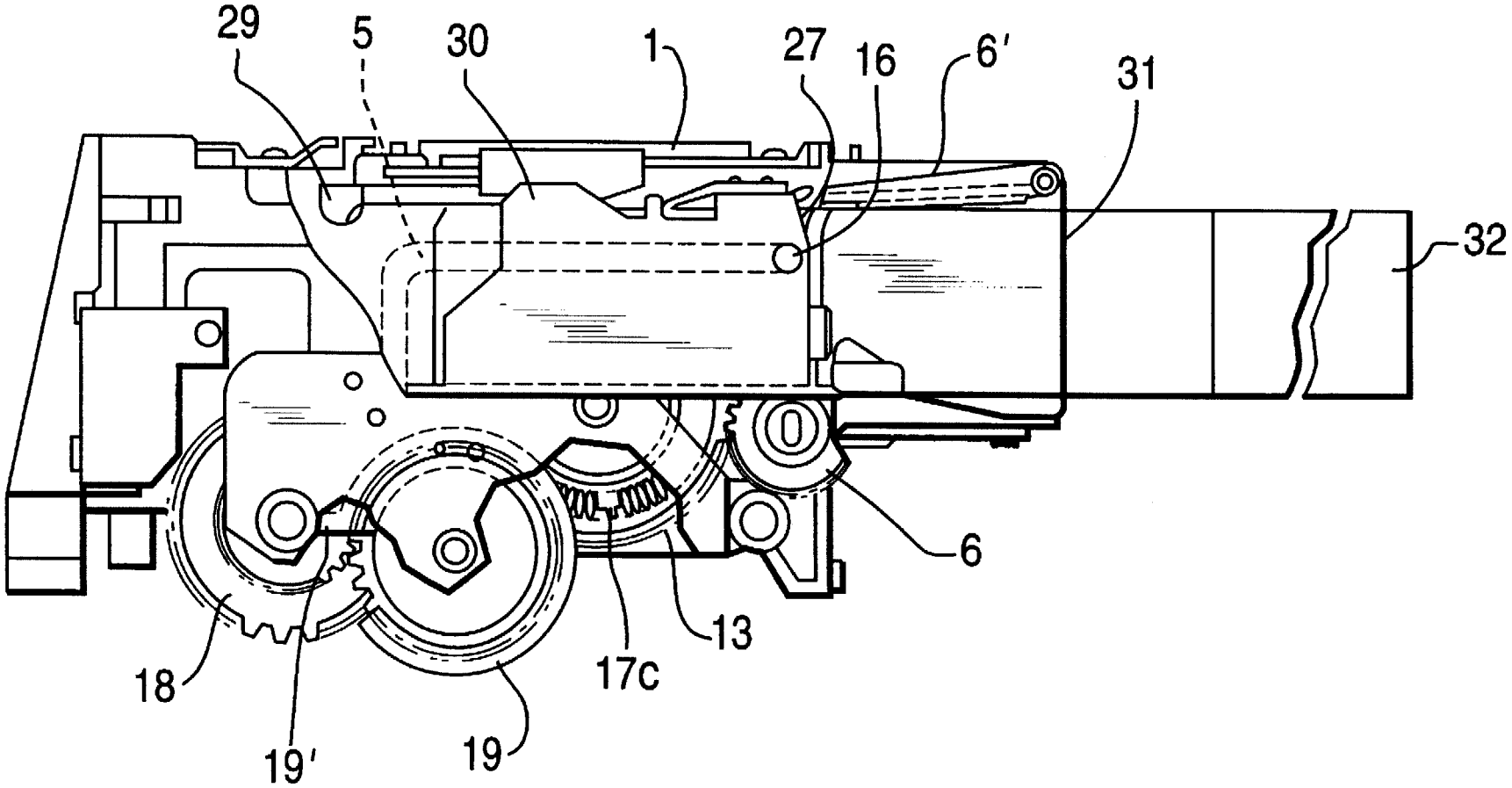
FIG. 2A is a side view illustrating a VCT inserted into the idling rotation mechanism of the present invention.

FIG. 2A is a side view illustrating a VCT 32 being inserted into the [idling rotation mechanism] *inside holder 30* of the present invention. During insertion, VCT 32 first passes through entrance 31 of housing 1 and then moves past inlet 27 of holder 30 so as to be positioned in holder 30.

Figure 2B:
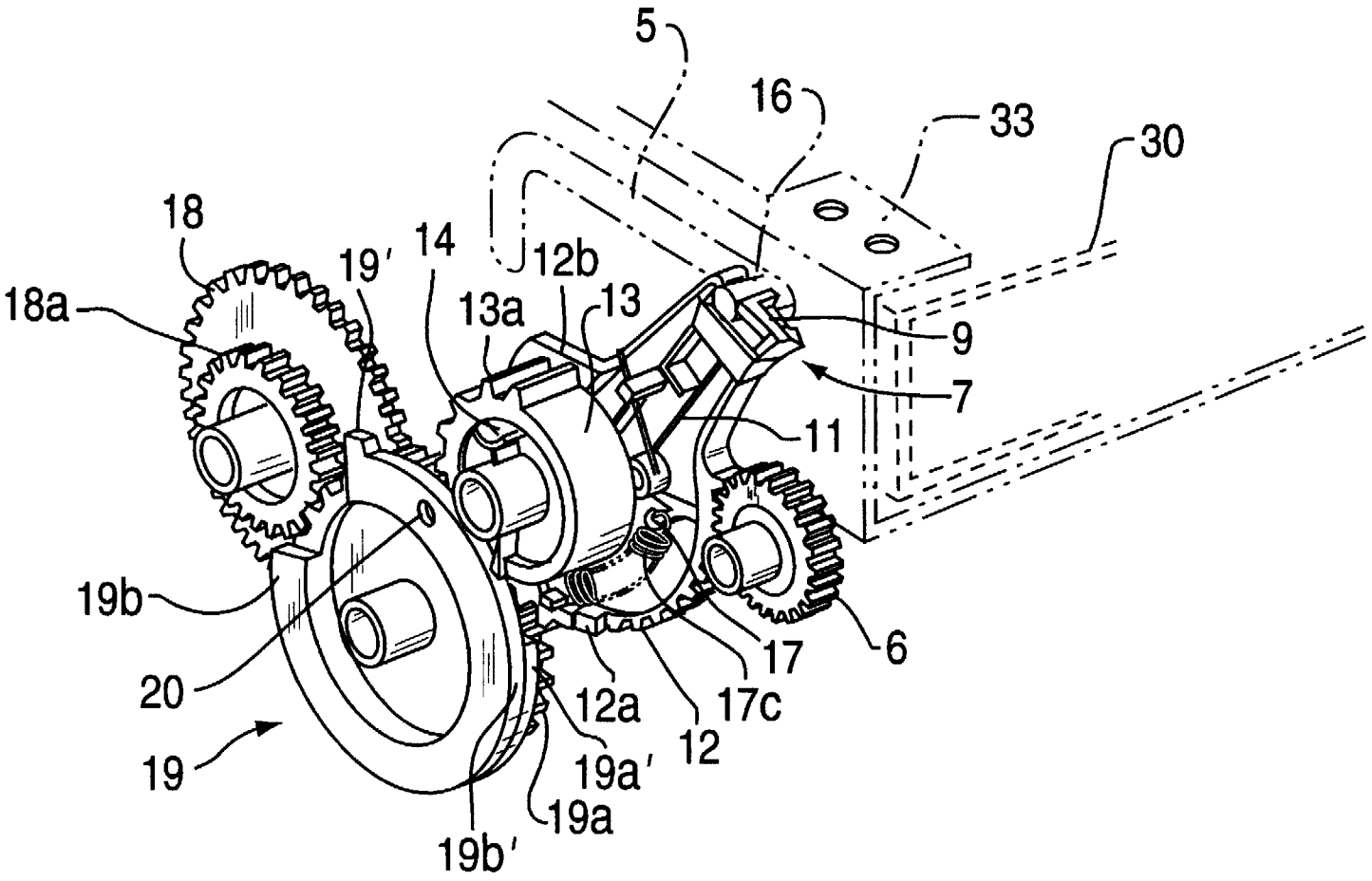
FIG. 2B is a perspective view illustrating assembly of the essential parts of the present invention.

Referring to FIG. 2B, bevel gear 18 is shown, mounted to rotating shaft 4, having a small gear 18a mounted on the back side of bevel gear 18 so that small gear 18a can transmit the driving force of motor 26 to timing gear 19.

FIG. 2B also shows a timing gear 19, mounted to rotating shaft 3, having a gear part 19a and a rotating plate 19b. Gear part 19a further comprises a sliding part 19a' whose length approximately amounts to the arc length of a half circle of gear part 19a. Moreover, sliding part 19a' partially overlays the gear teeth of gear part 19a. Rotating plate 19b, however, is partially cut and, on one end of the perimeter thereof along edge part 19b', has a stopper 19' projecting outwards. In addition, a guide hole 20, on rotating plate 19b, facilitates the alignment of arm gear 13 and timing gear 19 during the assembly of the idling rotation mechanism. Specifically, guide hole 20 is aligned, during assembly, with a portion of arm gear 13 so that the first tooth of geared part 13a can be properly positioned on gear part 19a for the coordinated rotation of arm gear 13 and timing gear 19.

Figure 2C:
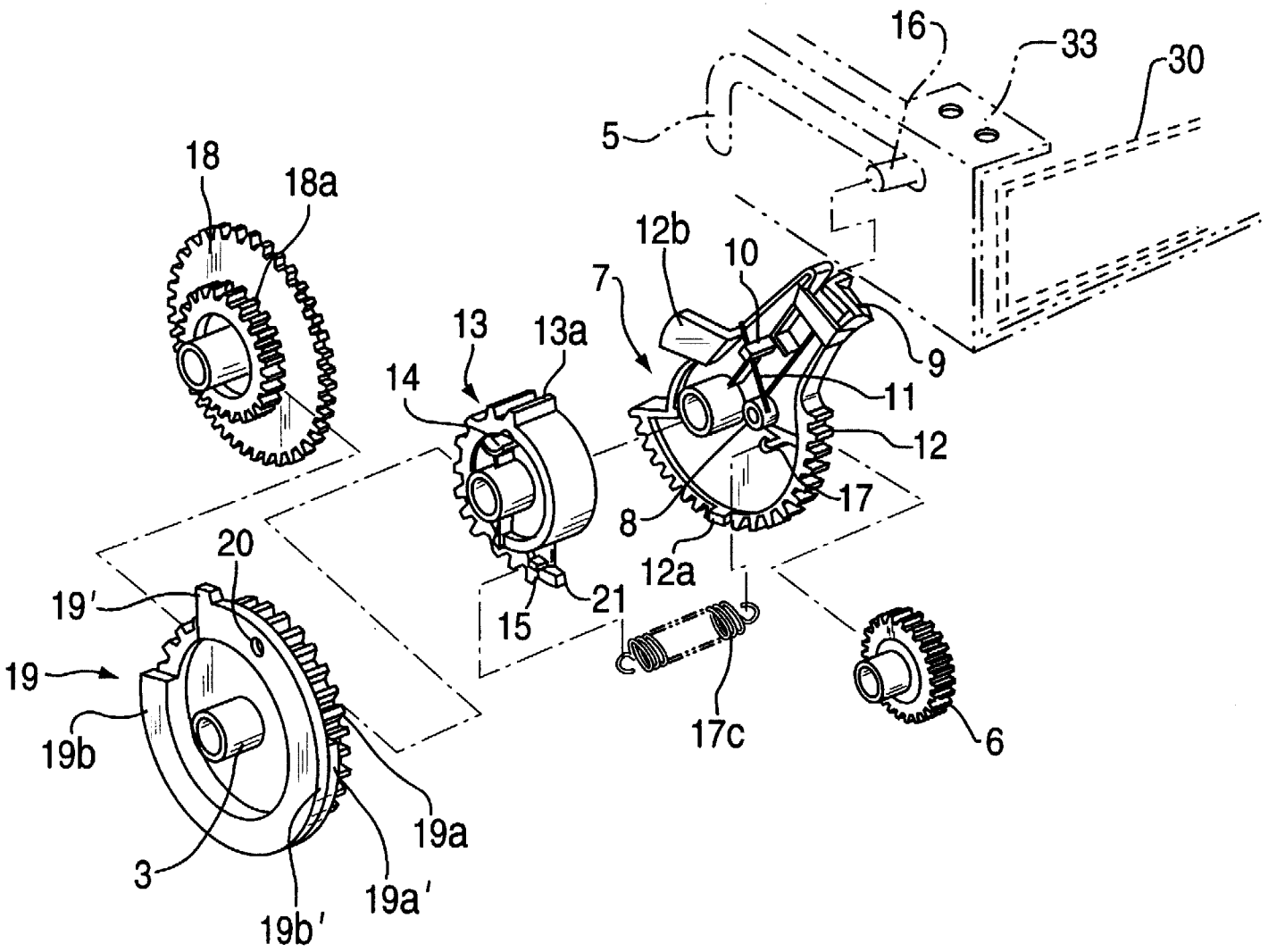
FIG. 2C is an exploded perspective view illustrating the essential parts of the present invention.

As shown in Figures 2B and 2C, an arm gear 13, rotatably mounted on rotating shaft 2, has a geared part 13a formed partially along its perimeter. Furthermore, a pin 14 projects towards timing gear 19 from the end of geared part 13a. As the arm gear 13 is rotated during the mounting and loading of the VCT, when the geared part 13a of arm gear 13 becomes disengaged from the gear part 19a, sliding part 19a', that does not have any gear teeth, contacts the geared part 13a of arm gear 13 and further rotates the arm gear 13 by frictional contact so that pin 14 contacts edge part 19b' of rotating plate 19b.

Also shown in Figures 2B and 2C is side arm 7. Side arm 7 is mounted to rotating shaft 2 so as to be coaxially mounted with respect to arm gear 13. Moreover, side arm 7 has a gear portion 12 formed on its perimeter so as to engage relay gear 6, a stopper 12a projecting inwardly from gear portion 12 so as to abut stop 21 on the beginning of geared part 13a, and a projecting lug 12b formed on [the] *side arm 7* opposite [side of] gear portion 12 so as to project towards arm gear 13. Thus, the excessive rotation of side arm 7, with respect to arm gear 13, will result in projecting lug 12b contacting arm gear 13.

Figure 3:
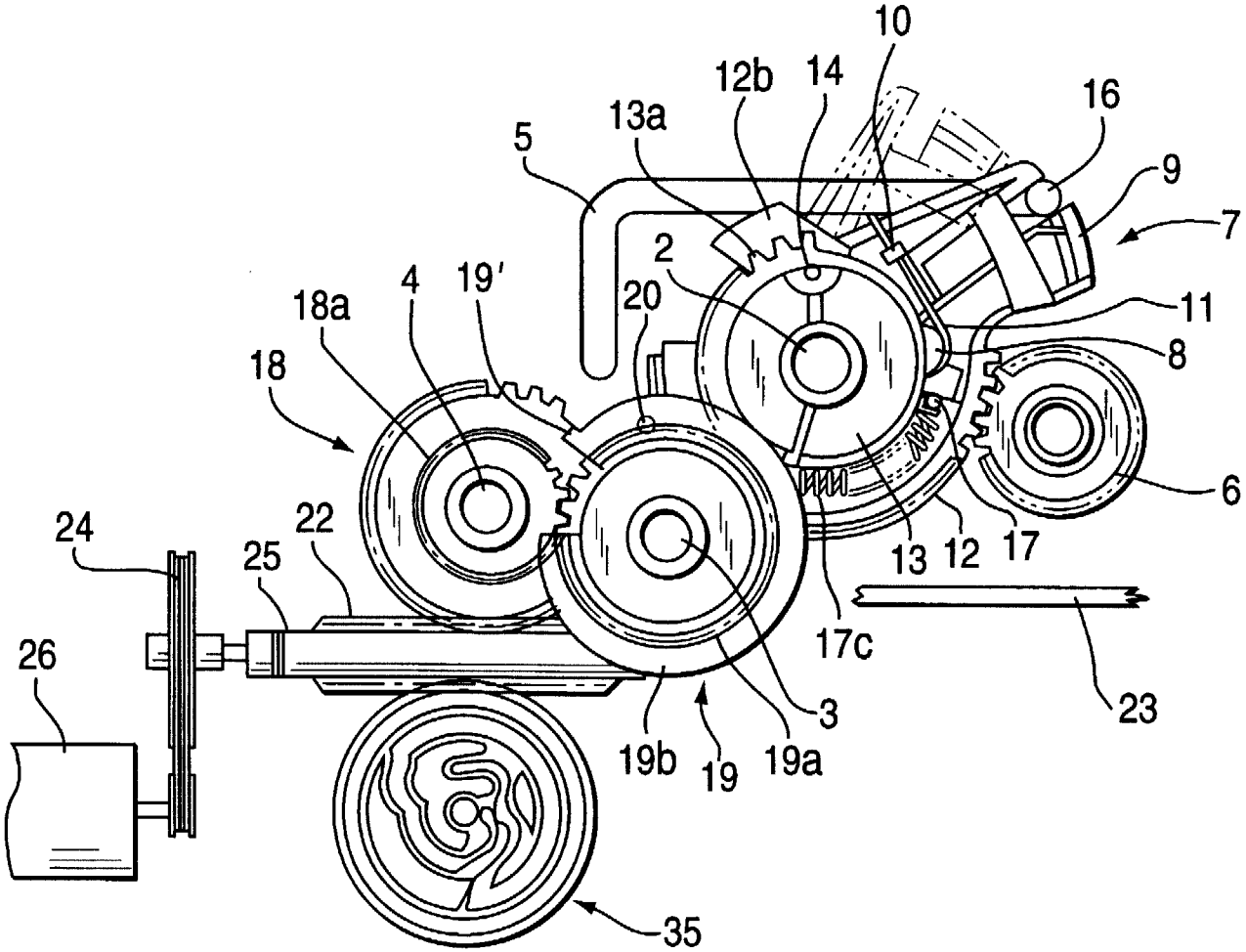
FIG. 3 is a side view of the tape recorder housing of the present invention illustrating the initial stage before a VCT is inserted into the VTR.
Figure 4:
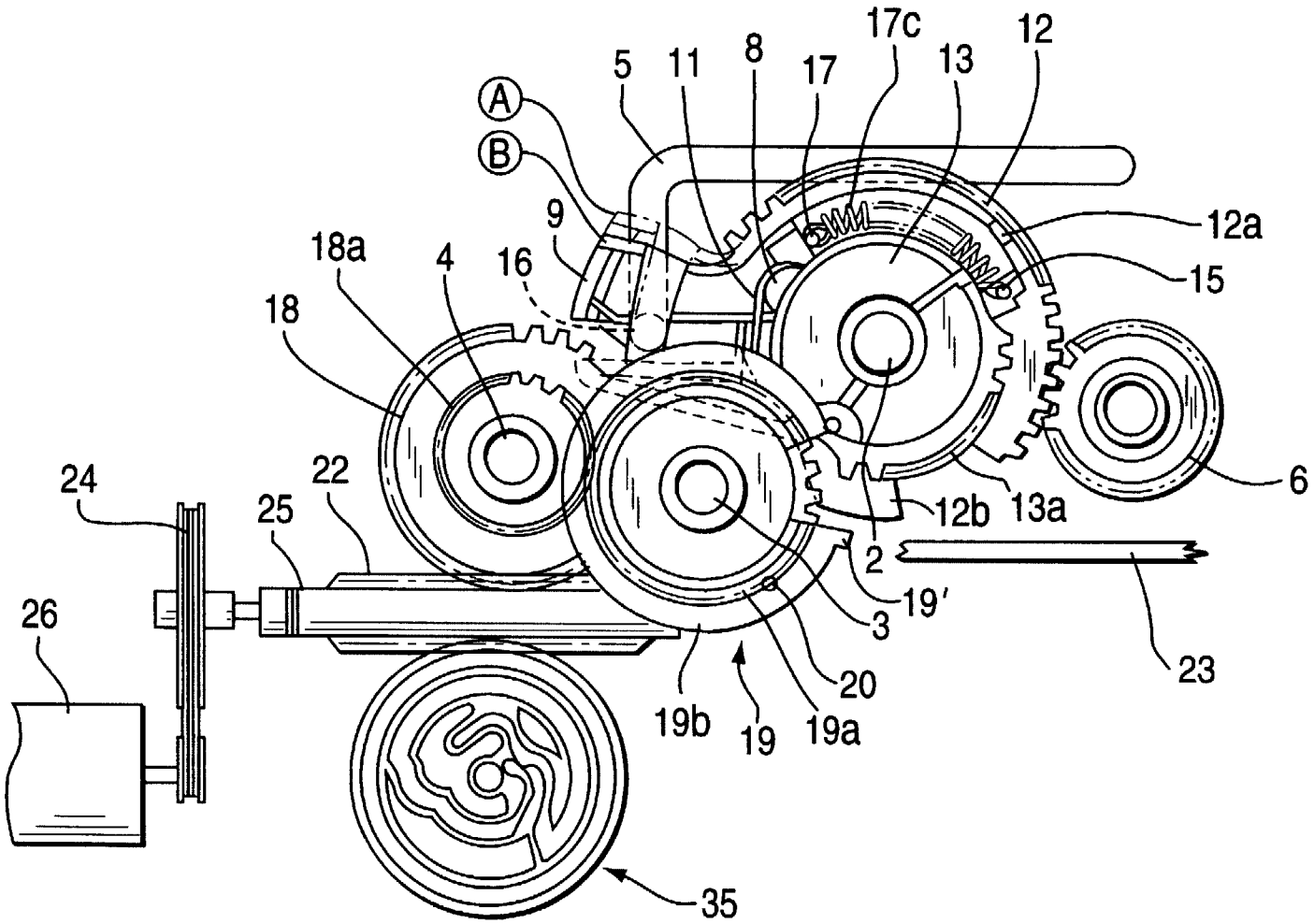
FIG. 4 is a side view illustrating the tape recorder housing of the present invention after a VCT has been loaded into the VTR.

Side arm 7 also comprises a spring holder 17 that, in conjunction with spring holder 15 on arm gear 13, holds ejector spring 17c so that stop 21 and stopper 12a can be in an abutting arrangement. Side arm 7 also has a gripper 9 to grip guide pin 16 which is connected with the inside holder 30. A boss 8, formed on the inner side of gripper 9, projects from side arm 7 so as to hold torsion spring 11 in conjunction with torsion spring [holders 10] *holder 10*. Figures 3 and 4 show bevel gear 18 engaged with an [ejector] *worm* gear 22 mounted inside a deck 23. Deck 23 is a structural piece of the VTR and holds the loading system assembly as well as the recording and playback tape heads. Moreover, [ejector] *worm* gear 22 is connected with a loading motor 26 via worm *drive* 24 and worm [gear] 25. As a result of the above interaction of bevel gear 18, [ejector] *worm* gear 22, worm *drive* 24, and worm [gear] 25, the transmitted rotational speed of motor 26 can be varied. In addition, [ejector] *worm* gear 22 also engages master cam 35, connectable to a series of arms and gears that are connectable to a grabbing device (not shown), so that the magnetic tape of the VCT can be drawn in and out of engagement with the playback and recording tape head drum by the grabbing device of the loading system.

The operation of the above-described invention will be explained as follows.

As shown in Figures 2A, 2B, 3 and 4, when VCT 32 is inserted through entrance 31 and inlet 27, VCT 32 contacts cassette switch 29 which activates the loading motor 26. The rotation of the loading motor 26 is determined by a system controller circuit in the VTR.

Since worm *drive* 24 is connected to loading motor 26, the rotation of loading motor 26 causes worm *drive* 24, worm [gear] 25 and [ejector] *worm* gear [25] *22* to rotate. The rotation of [ejector] *worm* gear [25] *22* then causes bevel gear 18 and master cam 35 to be rotated in a counter-clockwise rotation. Small gear 18a then rotates timing gear 19, due to the connection between small gear 18a and gear part 19a, in the clockwise direction which in turn rotates arm gear 13, due to the connection between geared part 13a and gear part 19a, in the counter-clockwise direction.

As a result of the abutting arrangement between *stop 21 of* arm gear 13 and stopper 12a of side arm 7, and the mounting of arm gear 13 and side arm 7 coaxially on shaft 2, the rotation of arm gear 13 will cause side arm 7 to also be rotated in a counter-clockwise direction. Therefore, as side arm 7 rotates guide pin 16 is moved along slot 5 by gripper 9. Accordingly, holder 30 and VCT 32 are moved along with guide pin 16. While guide pin 16 is moving along guide slot 5, gear portion 12 of side arm causes relay gear 6 to be rotated in the clockwise direction so as to close entrance 31 of the VTR as the VCT is moved into the VTR. *Rotation of relay gear 6 causes at least one access door 6' positioned at entrance 31 of the VTR to open or close.*

When guide pin 16 reaches position A on guide slot 5, gear part 19a becomes disengaged from geared part 13a and sliding part 19a', that does not have any gear teeth, contacts geared part 13a. The frictional contact between geared part 13a and sliding part 19a' causes geared part 13a to rotate so as to complete the loading action by the inside [system controller] *holder 30* before pin 14 abuts stopper 19'. [Simultaneously,] *When* guide pin 16 is moved to position B[. Then], *in FIG. 4,* the loading motor is stopped. In this condition, if the timing gear 19 abnormally keeps on rotating, the stopper 19' is obstructed by the pin 14 so as to prevent the timing gear 19 from rotating.

Hence, when the guide pin 16 is securely mounted in the position A of FIG. 4, during the initial mounting the VCT and thereafter, the idling rotation is achieved with a frictional force, guide pin 16 is moved to position B so that holder 30 strongly receives the resilient force of the torsion spring 11 so to prevent the movement of the VCT. Once in position B, so that the VCT is located on the deck by the drive means, the magnetic tape of VCT is withdrawn from the VCT by the grabber device of the loading system and placed into contact with the recording and playback tape head drum.

When unloading, the operation proceeds in the opposite direction to the above-mentioned process. Namely, the inside system controller circuit causes loading motor 26 to rotate in the opposite direction. Thereafter, loading motor 26 is driven for a few seconds so that timing gear 19 rotates in a counter-clockwise direction so as to dislodge pin 14 from edge portion 19b'. Gear part 19a of the timing gear 19 then engages geared part 13a of arm gear 13 so that both timing gear 19 and arm gear 13 rotate.

With the arm gear 13 rotating, guide pin 16 moves back along the guide slot 5 to eject VCT 32 from the VTR.

As described above, a singular loading motor 26, mounts and loads, or unloads and dismounts, VCT 32 from the VTR. In addition, the idling rotation mechanism allows VCT 32 to be mounted accurately, yet prevents the VCT from being forced when loaded the VTR. Moreover, irrespective of the operational changes of the system controller circuit, the idling rotation mechanism of the present invention is a relatively uncomplicated structure that is easily assembled, therefore, the rate of malfunctioning can be significantly reduced and the repairs easily performed.

The invention is in no way limited to the example described hereinabove. Various modifications of the disclosed embodiment, as well as other embodiments of the invention, will become apparent to persons skilled m the art upon reference to the description of the invention and the drawings. For example, the speed-varying elements could be partially or fully replaced by a pulley system. It is therefore contemplated that the appended claims will cover any such modifications or embodiments that fall within the true scope of the invention

What is claimed is:

1. An idling rotation mechanism in a housing of a video cassette tape recorder comprising:

a speed-variation means drivingly connectable to a motor so as to vary [the] *a* transmitted rotational speed thereof;

a cassette transporting holder engagable with a video cassette tape, said transporting holder is movable between an initial position and a mounted position;

a drive means connectable to the cassette transporting holder and the speed-variation means so as to move the transporting holder between *the initial position and the* mounted position;

a cut off means on said drive means to cut off the transmission of rotational forces from the motor to the drive means so as to prevent the transporting holder from continuing to move after reaching the mounted position;

said speed-variation means comprising:

a worm drivingly connectable to an output shaft of said motor;

a worm gear in meshing engagement with said worm; and a bevel gear, mounted on a first shaft extending from the housing, in meshing engagement with said worm gear to vary the transmitted rotational speed of said motor, and said means for cutting off rotation comprising:

a timing gear, rotatably mounted on a second shaft extending from said housing, in meshing engagement with a small gear on a back side of said bevel gear, said timing gear having a gear part, with a portion of the gear *part* covered by a sliding part, and a rotating plate having a cut out portion; and an arm gear, rotatably mounted on a third shaft extending from said housing, having a geared part that can be in meshing engagement with said gear part, said geared part having a pin at an end portion so that when said pin is rotated, along with the arm gear, the pin passes through the cut out portion so as to contact an edge part of the rotating plate and cut off the transmission of rotational forces of said motor after the geared part has been disengaged from the gear part.

2. A mechanism as claimed in claim 1, wherein said drive means comprises[;] *:* a side arm rotatably mounted on said third shaft coaxially with said arm gear, said side arm is drivingly connectable to said arm gear and has a gripper to engage a guide pin, connected to said transporting holder, so that the movement of the guide pin, along a guide slot formed in a support plate of said housing, by the side arm will cause the transporting holder to be moved in the housing;

a resilient means, connectable to said side arm, to engage said *guide* pin.

3. A mechanism as claimed in claim 2, wherein a relay gear, connectable to a gear portion on said side arm, can be rotated to open and close access doors to said housing.

4. An idling rotation mechanism in a housing of a video cassette tape recorder comprising[;]*:* a reversible motor having an output shaft;

a speed-variation means drivingly connectable to said output shaft of said motor to vary the transmitted rotational speed thereof;

a cassette transporting holder engagable with a video cassette tape, said transporting holder being movable between an initial position and a mounted position;

a drive means connectable to the transporting holder and the speed-variation means so as to move the transporting holder between the initial position and the mounted position;

a cut off means on said drive means to cut off the transmission of rotational forces from the motor to the drive means so as to prevent the transporting holder from continuing to move after reaching the mounted position, said cut off means being actuated by the rotational forces of said motor;

a power transmitting means, connectable to said motor and a loading assembly, to load and unload the video cassette tape from a tape head drum;

said speed-variation means comprising:

a worm drivingly connectable to an output shaft of said motor;

a worm gear in meshing engagement with said worm; and a bevel gear, mounted on a first shaft extending from the housing, in meshing engagement with said worm gear to vary the transmitted rotational speed of said motor; and said means for cutting off rotation comprising:

a timing gear, rotatably mounted on a second shaft extending from said housing, in meshing engagement with a small gear on a back side of said bevel gear, said timing gear having a gear part, with a portion of the gear part covered by a sliding part, and a rotating plate having a cut out portion; and an arm gear, rotatably mounted on a third shaft extending from said housing, having a geared part that can be in meshing engagement with said gear part, said geared part having a pin at an end portion so that when said pin is rotated, along with the arm gear, the pin contacts an edge part of the rotating plate and cuts off the transmission of rotational forces of said motor after the geared part has been disengaged from the gear part.

5. A mechanism as claimed in claim 4, wherein said drive means comprises[;]*:* a side arm rotatably mounted on said third shaft coaxially with said arm gear, said side arm is drivingly connectable to said arm gear and has a gripper to engage a guide pin[,] connected to said transporting holder, so that the movement of the guide pin, along a guide slot formed in a support plate of said housing, by the side arm will cause the transporting holder to be moved in the housing; *and* a resilient means, connectable to said side arm, to engage said *guide* pin.

6. A mechanism as claimed in claim 5, wherein a relay gear, connectable to a gear portion on said side arm, can be rotated to open and close *an* access [doors] *door* to said housing.

7. A mechanism as claimed in claim 6, wherein said power transmitting means [includes] *comprises* a gear member with cam curve.

*8. An idling rotation mechanism in a housing of a video cassette tape recorder, comprising:*

*speed-variation means drivingly connectable to a motor so as to vary a transmitted rotational speed of the motor;*

*a cassette transporting holder engagable with a video cassette tape, said cassette transporting holder being movable between an initial position and a mounted position;*

*drive means connectable to the cassette transporting holder and the speed-variation means for moving the cassette transporting holder between said initial position and said mounted position;*

*cut off means on said drive means, for interrupting transmission of rotational forces from the motor to the drive means so as to prevent the cassette transporting holder from continuing to move after reaching the mounted position;*

*said cut off means comprising:*

*a timing gear, rotatably mounted on a first shaft extending from said housing, in operational engagement with said speed-variation means, said timing gear having a gear part, with a portion of the gear part covered by a sliding part and a rotating plate having a cut-out portion; and*

*said drive means being rotatably mounted on a second shaft extending from said housing, and having a geared part that can be in meshing engagement with said gear part, said geared part having a projection at an end portion so that when said projection is rotated, along with an arm gear, the projection passes through the cut-out portion so as to contact an edge part of the rotating plate and cut off the transmission of rotational forces of said motor after the geared part has been disengaged from the gear part.*

*9. A mechanism as claimed in claim 8, wherein said drive means comprises:*

*means for engaging a guide pin connected to said cassette transporting holder so that the movement of the guide pin by the drive means, along a guide slot formed in a support plate of said housing, will cause the cassette transporting holder to be moved in the housing; and*

*resilient means connected between said drive means and said guide pin.*

*10. A mechanism as claimed in claim 9, further comprised of said resilient means being coupled to rotate with said drive means and to urge said guide pin into said mounted position as said drive means travels toward said mounted position.*

*11. A mechanism as claimed in claim 8, further comprised of resilient means coupled to rotated with said drive means, for urging said cassette transporting holder into said mounted position as said drive means travels toward said mounted position.*

*12. An idling rotation mechanism in a housing of a video cassette tape recorder, comprising:*

*speed-variation means drivingly connectable to a motor so as to vary a transmitted rotational speed transmitted from said motor;*

*a cassette transporting holder engagable with a video cassette tape, said cassette transporting holder being movable between an initial position and a mounted position;*

*drive means connectable to the cassette transporting holder and the speed-variation means so as to move the cassette transporting holder between said initial position and said mounted position;*

*cut off means on said drive means to cut off transmission of rotational forces from the motor to the drive means so as to prevent the cassette transporting holder from continuing to move after reaching the mounted position;*

*said speed-variation means comprising:*

*a worm drivingly connectable to an output shaft of said motor;*

*a worm gear in meshing engagement with said worm; and*

*a bevel gear mounted on a first shaft extending from the housing, in meshing engagement with said worm gear to vary the transmitted rotational speed of said motor; and*

*said means for cutting off rotation comprising:*

*a timing gear, rotatably mounted on a second shaft extending from said housing, in meshing engagement with a small gear on a back side of said bevel gear, said timing gear having a gear part, with a portion of the gear part covered by a sliding part, and a rotating plate having a cut out portion; and*

*an arm gear, rotatably mounted on a third shaft extending from said housing, having a geared part that can be in meshing engagement with said gear part, said geared part having a pin at an end portion so that when said pin is rotated, along with the arm gear, the pin passes through the cut out portion so as to contact an edge part of the rotating plate and contact a stopper on said edge part of the rotating plate to cut off the transmission of rotational forces of said motor after the geared part has been disengaged from the gear part.*

*13. An idling rotation mechanism in a housing of a video cassette tape recorder, comprising:*

*speed-variation means drivingly connectable to a motor so as to vary a transmitted rotational speed from the motor;*

*a cassette transporting holder movable between an initial position for receiving a video tape cassette and a mounted position enabling loading of tape from the video tape cassette;*

*drive means connectable to the cassette transporting holder, for moving the cassette transporting holder between said initial position and said mounted position;*

*cut off means on said drive means for interrupting the transmission of rotational forces from the motor to the drive means so as to prevent the cassette transporting holder from continuing to move after reaching the mounted position;*

*said cut off means comprising:*

*a timing gear, rotatably mountable on a second shaft extending from said housing, in operational engagement with said speed-variation means, said timing gear having a gear part, with a portion of a gear part covered by a continuous surface providing a sliding part and a rotating plate comprising a circumferential rim interrupted by a void sector; and*

*an arm gear, rotatably mounted on a third shaft extending from said housing, said arm gear having a geared part that can be in meshing engagement with said gear part, said geared part having a pin at an end portion so that when said pin is rotated along with the arm gear, the pin passes through the void sector so as to contact said rotating plate and interrupt transmission of rotational forces of said motor after the geared part has been disengaged from the gear part.*

*14. An idling rotation mechanism in a housing of a video cassette tape recorder, comprising:*

*speed-variation means drivingly connectable to a motor, for varying the transmitted rotational speed of the motor;*

*a cassette transporting holder movable between an initial position and a mounted position enabling loading of tape from the tape cassette;*

*drive means connectable to said cassette transporting holder and the speed-variation means, for moving the cassette transporting holder between said initial position and said mounted position;*

*said drive means comprising cut off means on said drive means, for interrupting transmission of rotational forces from the motor to the drive means so as to prevent the cassette transporting holder from continuing to move after reaching the mounted position;*

*said speed-variation means comprising:*

*a worm drivingly connectable to an output shaft of said motor;*

*a worm gear in meshing engagement with said worm; and*

*a bevel gear mounted on a first shaft extending from the housing, in meshing engagement with said worm gear to vary the transmitted rotational speed of said motor;*

*said cut off means comprising:*

*a timing gear rotatably mounted on a second shaft extending from said housing, in meshing engagement with a small gear on the back side of said bevel gear, said timing gear having a gear part, with a portion of the gear part covered by a continuous surface providing a sliding part, and a rotating plate comprising a circumferential rim interrupted by a void sector, and*

*an arm gear, rotatably mounted on a third shaft extending from said housing, having a geared part that can be in meshing engagement with said gear part, said geared part having a pin at an end portion so that when said pin is rotated, along with said arm gear, the pin passes through said void sector so as to contact an edge part of the rotating plate and interrupt transmission of rotational forces of said motor after the geared part has been disengaged from the gear part.*

*15. In a front-loading video cassette recorder including a mechanism for moving a cassette holder supporting a tape cassette from an initial position to a loaded position along a L-shaped path, an improved idling rotation mechanism having a first mode of operation, a second mode of operation and a third mode of operation, said improved idling rotation mechanism comprising:*

*a driving gear operatively connected to a motor so as to receive transmitted rotational force, said driving gear comprising a first protruding portion; and*

*a driven gear operatively connected to a side arm gear, whereby rotational force received by said driven gear from said driving gear in at least said first mode of operation produces displacement of the side arm gear to thereby move the cassette holder along the L-shaped path, said driven gear comprising a second protruding part;*

*whereby said rotational force is transmitted from said driving gear to said driven gear during said first mode of operation in response to meshing engagement of mutually opposing teeth on each of said driving gear and said driven gear;*

*whereby said rotational force is transmitted from said driving gear to said driven gear during said second mode of operation in response to friction between mutually opposing portions of said driving gear and said driven gear; and*

*whereby transmission of said rotational force is prevented in response to mutual engagement of said first protruding part and said second protruding part in said third mode of operation.*

*16. In a front-loading video cassette recorder including a mechanism for moving a cassette holder supporting a cassette tape between an initial position and a loaded position along a L-shaped path, an improved idling rotation mechanism comprising:*

*a driving gear operatively connected to a motor so as to receive transmitted rotational force, said driving gear comprising a first toothed portion, a continuous surface providing a first toothless portion and a first protruding portion; and*

*a driven gear operatively connected to an arm gear, whereby rotational force received by said driven gear from said driving gear produces displacement of said arm gear to thereby move said cassette holder along said L-shaped path, said driven gear comprising a complementary second toothed portion complementary to said first toothed portion, a complementary second toothless portion and a second protruding part;*

*whereby said rotational force is transmitted from said driving gear to said driven gear in response to meshing engagement of said first toothed portion and said complementary second toothed portion;*

*whereby said rotational force is transmitted from said driving gear to said driven gear in response to friction between said first untoothed portion and said complementary second untoothed portion; and*

*whereby transmission of said rotational force is prevented in response to mutual engagement of said first protruding part and said second protruding part.*

*17. In a front-loading video cassette recorder including a mechanism for moving a cassette holder supporting a tape cassette from an initial position to a loaded position along a L-shaped path, an improved idling rotation mechanism having a first mode of operation and a second mode of operation, said improved idling rotation mechanism comprising:*

*a driven gear operatively connected to a side arm gear, said driven gear comprising a first protruding portion;*

*a driving gear operatively connectable to a motor so as to receive transmitted rotational force from the motor, said driving gear transmitting said rotational force to said driven gear during said first mode of operation to produce displacement of the side arm gear to thereby move the cassette holder along the L-shaped path, said driving gear comprising first means for operatively engaging said first protruding portion during said second mode of operation;*

*said driving gear and said driven gear having meshing engagement of mutually opposed teeth of each of said driving gear and said driven gear during said first mode of operation to enable said transmitting of rotational force from said driving gear to said driven gear during said first mode of operation; and*

*mutual engagement of said first protruding portion and said first means preventing said transmission of rotational force from said driving gear to said driven gear during said second mode of operation.*

*18. The improved idling rotation mechanism of claim 17, further comprising said driving gear and said driven gear having mutually opposing and frictionally engagable portions, said driving gear frictionally engaging said driven gear during an intermediate mode of operation occurring between said first mode of operation and said second mode of operation.*

*19. A process of operation of an idling rotation mechanism in a front-loading video cassette recorder including a mechanism for moving a cassette holder supporting a cassette tape between an initial position to a loaded position along a L-shaped path, a driving gear operatively connected to a motor so as to receive transmitted rotational force, said driving gear including a first toothed portion, a first toothless portion and first protruding portion, and a driven gear operatively connected to an arm gear, whereby rotational force received by said driven gear from said driving gear produces displacement of said arm gear to thereby move said cassette holder along said L-shaped path, said driven gear including a complementary second toothed portion complementary to said first toothed portion, a complementary second toothless portion and a second protruding part, said process comprising the steps of:*

*directly transmitting said rotational force from said driving gear to said driven gear through meshing engagement of said first toothed portion and said complementary second toothed portion;*

*frictionally transmitting said rotational force from said driving gear to said driven gear through interaction between said first toothless portion and said complementary second toothless portion; and*

*when one of said driving gear and said driven gear reaches a maximum rotational limit, preventing transmission of said rotational force in response to mutual engagement of said first protruding part and said second protruding part.*

*20. An idling rotation mechanism in a housing of a video cassette tape recorder, comprising:* speed-*variation means drivingly connectable to a motor so as to vary a transmitted rotational speed of the motor;*

*a cassette transporting holder engagable with a video cassette tape, said transporting holder being movable between an initial position and a mounted position;*

*drive means connectable to the cassette transporting holder and the speed-variation means, for moving the cassette transporting holder between said initial position and said mounted position;*

*cut off means on said drive means, for interrupting transmission of rotational forces from the motor to the drive means so as to prevent the cassette transporting holder from continuing to move after reaching the mounted position;*

*said speed-variation means comprising:*

*a worm drivingly connectable to an output shaft of the motor; and*

*a worm gear in meshing engagement with said worm;*

*said means for cutting off rotation comprising:*

*a timing gear, rotatably mounted on a first shaft extending from said housing, in operational engagement with said worm gear, said timing gear having a gear part, with a portion of the timing gear covered by a sliding part, and a rotating plate having a cut-out portion; and*

*an arm gear, rotatably mounted on a second shaft extending from said housing, said arm gear having a geared part that can be in meshing engagement with said gear part, said geared part having a projection at an end portion so that when said projection is rotated along with the arm gear, the projection passes through the cut-out portion so as to contact an edge part of the rotating plate and cut off the transmission of rotational forces of said motor after the geared part has been disengaged from the gear part.*

*21. A mechanism as claimed in claim 20, wherein said drive means comprises:*

*a side arm rotably mounted on said second shaft coaxially with said arm gear, said side arm being drivingly connectable to said arm gear and having means for engaging a guide pin connected to said transporting holder, so that the movement of the guide pin by the side arm, along a guide slot formed in a support plate of said housing, will cause the transporting holder to be moved in the housing; and*

*resilient means, connectable to said side arm, for engaging said guide pin.*

*22. A mechanism as claimed in claim 21, wherein a relay gear, connectable to a gear portion on said side arm, can be rotated to open and close access doors to said housing.*

*23. An idling rotation mechanism in a housing of a video cassette tape recorder, comprising:*

*speed-variation means drivingly connectable to a motor so as to vary a transmitted rotation speed of the motor;*

*a cassette transporting holder engagable with a video cassette tape, said cassette transporting holder being movable between an initial position and a mounted position;*

*drive means connectable to the cassette transporting holder and the speed-variation means, for moving the cassette transporting holder between said initial position and said mounted position;*

*cut off means on said drive means, for interrupting transmission of rotational forces from the motor to the drive means so as to prevent the cassette transporting holder from continuing to move after reaching the mounted position;*

*said cut off means comprising:*

*a timing gear, rotatably mounted on a first shaft extending from said housing, in operational engagement with said speed-variation means, said timing gear having a gear part, with a portion of the gear part covered by a sliding part, and a rotating plate having a cut-out portion; and*

*an arm gear, rotatably mounted on a second shaft extending from said housing, said arm gear comprising a geared part that can be in meshing engagement with said gear part, said geared part having a projection at an end portion so that when said arm gear is rotated, the projection passes through the cut-out portion so as to contact an edge part of the rotating plate and cut off the transmission of rotational forces of said motor after the geared part has been disengaged from the gear part.*

*24. A mechanism as claimed in claim 23, wherein said drive means comprises:*

*a side arm rotatably mounted on said second shaft coaxially with said ann gear, said side arm being drivingly connectable to said arm gear and having means for engaging a guide pin connected to said cassette transporting holder, so that the movement of the guide pin by the side arm, along a guide slot formed in a support plate of said housing, will cause the cassette transporting holder to be moved in the housing; and*

*resilient means, connectable to said side arm, for engaging said guide pin.*

*25. A mechanism as claimed in claim 24, wherein a relay gear, connectable to a gear portion on said side arm, can be rotated to open and close access doors to said housing.*

*26. An idling rotation mechanism in a housing of a video cassette tape recorder, comprising:*

*speed-variation means drivingly connectable to a motor so as to vary a transmitted rotational speed thereof;*

*a cassette transporting holder positioned to receive a video cassette tape, said cassette transporting holder being movable between an initial position for receiving the video tape cassette and a mounted position enabling loading of tape from the video tape cassette;*

*drive means connectable to the cassette transporting holder and the speed-variation means so as to move the cassette transporting holder between said initial position and said mounted position;*

*idling rotation means having at least one idleable component so as to prevent further movement of the drive means after said cassette transporting holder has reached said mounted position, said idling rotation means comprising:*

*a timing gear rotatably engaging and driven by said speed-variation means; and*

*an arm gear engaging said drive means, said arm gear being driven by said timing gear, said arm gear comprising a gearless outer circumferential portion and a geared outer circumferential portion, wherein said idling rotation means transmits rotational energy while said timing gear engages said geared outer circumferential portion and interrupts said transmission of said rotational energy while said gearless outer circumferential portion faces said timing gear.*

*27. The idling rotation mechanism of claim 26, further comprising cut off means for stopping the rotational force from the motor to stop the idling rotation.*

*28. The idling rotation mechanism of claim 27, comprising of said cut off means comprising:*

*a pin on said arm gear, and*

*stopper means on said timing gear, for engaging said pin, whereby after said cassette transporting holder reaches said mounted position, said pin abuts said stopper means so as to prevent said timing gear from rotating.*

*29. The idling rotation mechanism of claim 26, comprised of: said arm gear comprising:*

*said geared outer circumferential portion defining an arc of less than three hundred and sixty degrees, and*

*means for extending outwardly from said arm gear and toward said timing gear; and*

*said timing gear further comprising an arcuate member extending around a central axis of said timing gear, and a void interrupting continuity of said arcuate member and receiving said extending means as said cassette transporting holder reaches said mounted position, engagement of said extending means by said arcuate member accommodating rotation of said timing gear as said cassette transporting holder reaches said mounted position.*

*30. The idling rotation mechanism of claim 26, comprised of:*

*said arm gear comprising means for extending outwardly from said arm gear and toward said timing gear; and*

*said timing gear further comprising an intermediate portion comprising an arcuate surface extending around a central axis of said timing gear, and a void sector interrupting continuity of said surface and receiving said extending means as said cassette transporting holder reaches said mounted position.*

*31. The idling rotation mechanism of claim 26, comprised of:*

*said arm gear comprising means for extending outwardly from said arm gear and toward said timing gear; and*

*said timing gear further comprising an intermediate portion comprising an arcuate surface extending around a central axis of said timing gear, and a void sector interrupting continuity of said surface and receiving said extending means as said cassette transporting holder reaches said mounted position, engagement of said extending means by said arcuate surface accommodating rotation of said timing gear as said cassette transporting holder reaches said mounted position.*

*32. The idling rotation mechanism of claim 26, comprised of:*

*said arm gear comprising means for extending outwardly from said arm gear and toward said timing gear; and*

*said timing gear further comprising an intermediate portion comprising an arcuate surface extending around a central axis of said timing gear, and a void sector interrupting continuity of said surface and receiving said extending means as said cassette transporting holder reaches said mounted position, engagement of said extending means by said arcuate surface accommodating rotation of said timing gear after said cassette transporting holder has reached said mounted position.*

*33. The idling rotation mechanism of claim 26, comprised of:*

*said arm gear comprising means for extending axially outwardly from said arm gear and toward said timing gear; and*

*said timing gear further comprising an intermediate portion comprising an arcuate surface extending around a central axis of said timing gear, and a void sector interrupting continuity of said surface and receiving said extending means as said cassette transporting holder reaches said mounted position.*

*34. The idling rotation mechanism of claim 26, comprised of:*

*said arm gear comprising means for extending axially outwardly from said arm gear and toward said timing gear; and*

*said timing gear further comprising an intermediate portion comprising an arcuate surface extending around a central axis of said timing gear, and a void sector interrupting continuity of said arcuate surface and receiving said extending means as said cassette transporting holder reaches said mounted position, engagement of said extending means by said arcuate surface accommodating rotation of said timing gear as said cassette transporting holder reaches said mounted position.*

*35. The idling rotation mechanism of claim 26, comprised of:*

*said arm gear comprising means for extending axially outwardly from said arm gear and toward said timing gear; and*

*said timing gear further comprising an intermediate portion comprising an arcuate member extending around a central axis of said timing gear, and a void sector interrupting continuity of said member and receiving said extending means as said cassette transporting holder reaches said mounted position, engagement of said extending means by said arcuate member accommodating rotation of said timing gear after said cassette transporting holder has reached said mounted position.*

*36. The idling rotation mechanism of claim 26, comprised of:*

*said arm gear comprising means for extending outwardly from said arm gear and toward said timing gear; and*

*said timing gear further comprising an arcuate array of teeth disposed to engage said geared outer portion and an intermediate portion coaxially disposed adjacent to said arcuate array of teeth, said intermediate portion comprising an arcuate member extending around a central axis of said timing gear, and a void sector interrupting continuity of said member and receiving said extending means as said cassette transporting holder reaches said mounted position.*

*37. The idling rotation mechanism of claim 26, comprised of:*

*said arm gear comprising means for extending outwardly from said arm gear and toward said timing gear; and*

*said timing gear further comprising an arcuate array of teeth disposed to engage said geared outer portion and an intermediate portion coaxially disposed adjacent to said arcuate array of teeth, said intermediate portion comprising an arcuate member extending around a central axis of said timing gear, and a void sector interrupting continuity of said arcuate member and receiving said extending means as said cassette transporting holder reaches said mounted position, engagement of said extending means by said arcuate member accommodating rotation of said timing gear after said cassette transporting holder has reached said mounted position.*

*38. The idling rotation mechanism of claim 26, comprised of:*

*said arm gear comprising means for extending outwardly from said arm gear and toward said timing gear; and*

*said timing gear further comprising an arcuate array of teeth disposed to engage said geared outer portion and an intermediate portion coaxially disposed adjacent to said arcuate array of teeth, said intermediate portion comprising an arcuate member extending around a central axis of said timing gear, and a void portion interrupting continuity of said arcuate member and receiving said extending means as said cassette transporting holder reaches said mounted position.*

*39. The idling rotation mechanism of claim 26, comprised of:*

*said arm gear comprising means for extending axially outwardly from said arm gear and toward said timing gear; and*

*said timing gear further comprising an arcuate array of teeth disposed to engage said geared outer portion and an intermediate portion coaxially disposed adjacent to said arcuate army of teeth, said arcuate portion comprising an arcuate member extending around a central axis of said timing gear, and a void portion interrupting continuity of said arcuate member and receiving said extending means as said cassette transporting holder reaches said mounted position.*

*40. The idling rotation mechanism of claim 26, comprised of:*

*said arm gear comprising means for extending axially outwardly from said arm gear and toward said timing gear; and*

*said timing gear further comprising an arcuate army of teeth disposed to engage said geared outer portion and an intermediate portion coaxially disposed adjacent to said arcuate array of teeth, said intermediate portion comprising an arcuate member extending around a central axis of said timing gear, and a void portion interrupting continuity of said arcuate member and receiving said extending means as said cassette transporting holder reaches said mounted position, engagement of said extending means by said arcuate member accommodating rotation of said timing gear as said cassette transporting holder reaches said mounted position.*

*41. The idling rotation mechanism of claim 26, comprised of:*

*said arm gear comprising means for extending axially outwardly from said arm gear and toward said timing gear; and*

*said timing gear further comprising an arcuate army of teeth disposed to engage said geared outer portion and an intermediate portion coaxially disposed adjacent to said arcuate array of teeth, said intermediate portion comprising an arcuate member extending around a central axis of said timing gear, and a void portion interrupting continuity of said arcuate member and receiving said extending means as said cassette transporting holder reaches said mounted position, engagement of said extending means by said arcuate member accommodating rotation of said timing gear after said cassette transporting holder has reached said mounted position.*

*42. The idling rotation mechanism of claim 26, comprised of:*

*said arm gear comprising means for extending outwardly from said arm gear and toward said timing gear; and*

*said timing gear further comprising an arcuate member extending around a central axis of said timing gear, and a void interrupting continuity of said member and receiving said extending means as said cassette transporting holder reaches said mounted position.*

*43. The idling rotation mechanism of claim 26, comprised of:*

*said arm gear comprising means for extending outwardly from said arm gear and toward said timing gear; and*

*said timing gear further comprising an arcuate member extending around a central axis of said timing gear, and a void interrupting continuity of said member and receiving said extending means as said cassette transporting holder reaches said mounted position, engagement of said extending means by said arcuate member accommodating rotation of said timing gear as said cassette transporting holder reaches said mounted position.*

*44. The idling rotation mechanism of claim 26, comprised of:*

*said arm gear comprising:*

*said geared outer circumferential portion defining an arc of less than three hundred and sixty degrees, and means for extending outwardly from said arm gear and toward said timing gear; and*

*said timing gear further comprising an arcuate member extending circularly around a central axis of said timing gear, and a void interrupting continuity of said arcuate member and receiving said extending means as said cassette transporting holder reaches said mounted position.*

* * * * *